United States Patent [19]
Kepplinger et al.

[11] Patent Number: 6,149,961
[45] Date of Patent: Nov. 21, 2000

[54] FAT SUBSTITUTE FORMULATION AND METHODS FOR UTILIZING SAME

[75] Inventors: John Kepplinger; Brian Guthrie, both of Portage, Mich.

[73] Assignee: W. K. Kellogg Institute, Battle Creek, Mich.

[21] Appl. No.: 09/197,054

[22] Filed: Nov. 20, 1998

Related U.S. Application Data

[60] Provisional application No. 60/066,326, Nov. 21, 1997.

[51] Int. Cl.$^7$ .................................................. A23D 9/007
[52] U.S. Cl. ........................ 426/553; 426/565; 426/601; 426/611; 426/804
[58] Field of Search .................................. 426/601, 804, 426/611, 553, 565

[56] References Cited

U.S. PATENT DOCUMENTS

| | | | |
|---|---|---|---|
| 4,103,039 | 7/1978 | Mandai | 426/607 |
| 4,229,483 | 10/1980 | Oura | 426/250 |
| 5,456,939 | 10/1995 | Wheeler | 426/607 |

OTHER PUBLICATIONS

Svern 1979 Baileys Industrial Oil and Fat Products vol.1 $4^{th}$ Ed. John Wiley & Sons New York pp. 241J 323, 328.

Beckett 1994 Industrial Chocolate Manufacture and Use Blackie Academic & Professional New York pp. 246–251.

Kershaw 1981 JAOCS pp. 706–710.

Hawley's Condensed Chemical Dictionary Thirteenth Edition; Copyright 1997; Title Page, Face Sheet, p. 487.

*European Journal of Clinical Nutrition* (1998) vol. 52, pp. 334–343; "Plant sterol–enriched margarines and reduction of plasma total–and LDL–cholesterol concentrations in normocholesterolaemic and mildly hypercholesterolaemic subjects"; by J.A. Westrate and G.W. Meijer.

*Primary Examiner*—Carolyn Paden
*Attorney, Agent, or Firm*—Howard & Howard

[57] ABSTRACT

A fat substitute is disclosed comprising a Shea nut extract blended with a diluent fat to produce a plasticized Shea nut extract. The plasticized Shea nut extract can be readily substitute for a part or all of the fat content of a prepared food product. The plasticized Shea nut extract maintains the taste and manufacturability of the full fat prepared food product. In addition, the plasticized Shea nut extract reduces the fat content of the prepared food product because the components of Shea nut extract are not fats. In a preferred embodiment the Shea nut extract is blended with sunflower oil to produce the plasticized Shea nut extract. The plasticized Shea nut extract can be utilized in a wide range of fat containing prepared food products including cookies, brownies, popcorn, and ice cream.

19 Claims, No Drawings

FAT SUBSTITUTE FORMULATION AND METHODS FOR UTILIZING SAME

This application claims the benefit of U.S. Provisional application Ser. No. 60/066,326, filed on Nov. 21, 1997.

BACKGROUND OF THE INVENTION

The present invention relates to a fat substitute and a method for reducing fat content in food products. In particular, the fat substitute of the present invention comprises a Shea nut extract having a high level of α-amyrin and other similar components which can be used in food products.

Phytosterols are found in vegetable oils and are consumed at levels of 160–360 mg in a typical diet. In addition to the ability of some phytosterols to lower serum cholesterol, phytosterols have been recognized as providing a positive impact on a broad range of physiological diseases. Studies have been published on the ability of various sterols to reduce serum cholesterol and inhibit prostate and colon cancers.

Phytosterols broadly include any of several plant alcohols that have the properties of sterols and are defined herein to include sterols, stanols and their esterified derivatives. Some representative phytosterols include β-sitosterol, campesterol, and stigmasterol. Phytosterols are related to cholesterol and have a ring structure that is similar to cholesterol with the differences residing in the structure of a side chain branch from one of the carbon atoms in one of the rings. Some phytosterols have become the focus of increased investigation as they have been found to be potent and efficacious agents for the reduction of serum cholesterol levels. U.S. Pat. No. 5,502,045 to Meittinen, et al., assigned to Raision Tehtaat Oy AB, issued Mar. 26, 1996, discloses that the phytosterol β-sitostanol fatty ester or fatty acid ester mixture, when added to food, can lower cholesterol levels in serum.

The present invention relates to the utilization of a Shea nut extract having a high level of the triterpene α-amyrin, and related derivatives, in foods as a fat replacer. The triterpene family of compounds is structurally different from the broad category of phytosterols, although it is generally classified as a phytosterol. Unlike the phytosterol β-sitosterol, α-amyrin is not very efficacious in lowering serum cholesterol levels, as shown in a study by J. A. Westrate and G. W. Meijer published in the European Journal of Clinical Nutrition, May, 1998, Volume 52, pp. 334–341.

Increasingly, consumers are demanding prepared food products that have good taste and that provide health benefits. Examples of these food products include frozen entrees, ice cream, dessert items, baked goods such as cookies, crackers, muffins, pastries or brownies, savory snacks and popcorn that are sold to consumers. One problem with many prepared food products is that they often contain high levels of fat. The high levels of fat are used to provide taste and to aid in the manufacturing of these products. Excessive consumption of fat has been linked to heart disease and many other disease conditions. Thus it is desirable to provide a fat substitute that can be incorporated into prepared food products without requiring significant alterations in the manufacturing process or negatively altering the taste of the product. In addition, it is desirable to incorporate a fat substitute which lowers the fat content and caloric value of the prepared food product.

The present invention provides a fat substitute that can replace all or a portion of the fat normally found in a prepared food product. The fat substitute reduces the actual fat content and caloric value while maintaining the taste and manufacturability of a full fat product.

SUMMARY OF THE INVENTION

The present invention relates to a fat substitute and methods for its use in food products. In particular, the fat substitute comprises a plasticized Shea nut extract having a high level of α-amyrin and related derivatives. The plasticized Shea nut extract of the present invention can be readily substituted for fat in prepared food products and leads to a reduction in the fat content and caloric value of the prepared food product because a significant portion of the components of the Shea nut extract are not chemically classified as fats under the current Nutritional Labeling Education Act (NLEA) methods and standards for product labeling and are not readily metabolized.

The method of the present invention comprises the steps of blending a predetermined amount of a diluent fat with a predetermined amount of a Shea nut extract to form a plasticized Shea nut extract. Next a predetermined portion of the fat content in a food product is removed and a predetermined amount of the plasticized Shea nut extract is added to the food product. Thus, the fat content and the caloric value of the food product can be reduced. In a preferred embodiment the diluent fat comprises sunflower oil. The prepared food product may comprise any prepared food product that normally includes fat as one of its components, for example, cookies, brownies, ice cream, or popcorn.

In a preferred embodiment, a prepared food product designed in accordance with the present invention comprises a prepared food product including a predetermined amount of a plasticized Shea nut extract, with the plasticized Shea nut extract including between 5 parts to 98 parts of a diluent fat and between 2 parts and 95 parts of a Shea nut extract.

These and other features and advantages of this invention will become more apparent to those skilled in the art from the following detailed description of the presently preferred embodiment.

DETAILED DESCRIPTION OF THE PREFERRED EMBODIMENT

Phytosterols and the α-amyrin containing Shea nut extract typically have a thick, hard consistency. However, phytosterols and the Shea nut extract are fat miscible and, therefore, can be mixed, blended, solubilized or dissolved into a fat, such as animal, vegetable, or synthetic fat, to yield a plasticized mixture of the α-amyrin containing Shea nut extract and the fat. These fats are referred to as diluent fats in this specification and the claims. Examples of diluent fats are those derived from edible sources such as soybeans, rapeseed, corn, rice, cottonseed, safflower, sunflower, oat, barley, bovine, porcine and fish. Preferably the diluent fat used is liquid sunflower oil.

The phytosterols β-sitosterol, campesterol, and stigmasterol have the following structure:

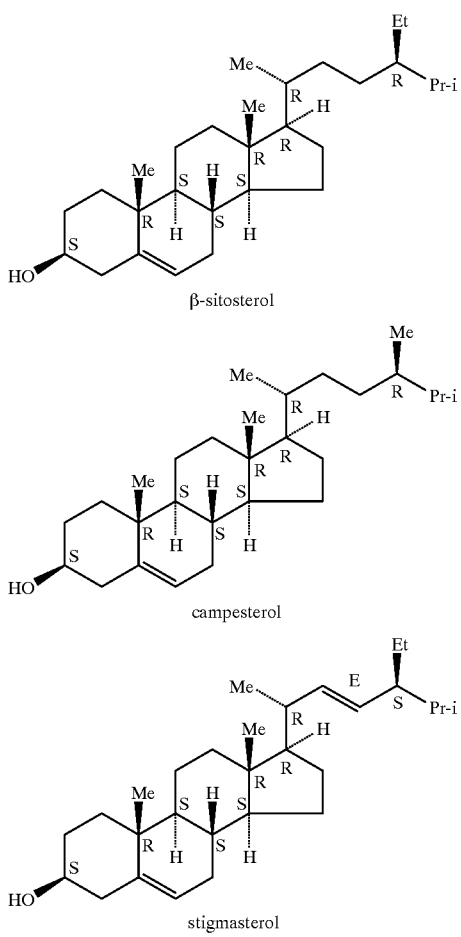

β-sitosterol campesterol stigmasterol

The triterpene α-amyrin has the following structure:

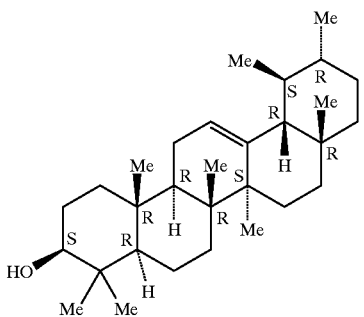

The α-amyrin in the Shea nut extract exists naturally as a mixture of esterified forms such as cinnamic and acetic acid esters. It is preferable to maintain the α-amyrin in its naturally esterified state. Additionally, α-amyrin can be esterified with various other compounds such as fatty acids, aromatic acids like ferulic acid and sugar compounds through glycosidic linkages utilizing methods known to those skilled in the art.

Shea nuts are a plant source having high levels of α-amyrin. The Shea nuts are processed to produce oil and a waste stream. The concentrated α-amyrin level is found in the waste stream extract of the Shea nuts. Commercially, Shea nut extract having a high level of the α-amyrin can be obtained from Loders Croklaan, Wormerveer, The Netherlands. The Shea nut extract is combined with a diluent fat, such as a vegetable oil, to form a plasticized Shea nut extract that can be used as a fat substitute. Preferably, the diluent fat is sunflower oil and preferably the Shea nut extract is mixed in a one to one ratio with the sunflower oil. In this specification and the accompanying claims the term Shea nut extract refers to the waste stream from the extraction of Shea nuts that has high levels of α-amyrin and other sterols that are not the phytosterols β-sitosterol, campesterol, or stigmasterol. In this specification and the accompanying claims the term plasticized Shea nut extract refers to the Shea nut extract in combination with a diluent fat to produce a plasticized product.

Shea nut oil has been shown to contain virtually no β-sitosterol, campesterol, or stigmasterol, but large amounts of α-amyrin as described in a study by J A Weststrate and G W Meijer published in the European Journal of Clinical Nutrition, May, 1998, Volume 52, pp. 334–343. In that same study it was shown that consumption of margarine enriched with either β-sitosterol, campesterol, or stigmasterol reduced serum cholesterol levels in humans, but margarine enriched with α-amyrin did not lower serum cholesterol indicating that the two classes of compounds have different chemical and pharmacological properties.

The plasticized Shea nut extract can be utilized as a fat substitute or replacement in a wide variety of food products. The plasticized Shea nut extract possesses a similar functionality to a vegetable or animal shortening or spread. The plasticized Shea nut extract can be readily substituted for shortening in baked goods and can replace the fat normally found in food products such as cereal products, margarines/ spreads, dairy products such as milk, ice cream, yogurt and fabricated cheese, snack foods such as popcorn, chips, and other extruded products, shortenings or oils for deep fat frying, fabricated meat products such as bologna or sausage, beverages, salad dressings, and the like. As compared with other fat substitutes, the present plasticized Shea nut extract can be easily and readily incorporated into existing formulae with minimal or no loss of product quality and without the gastrointestinal implications of other currently available fat substitutes.

The Shea nut extract of the present invention, when mixed in equal parts with a diluent fat, reduces the fat content of the resultant plasticized Shea nut extract by a significant amount while still maintaining the functionality of a full fat composition. The plasticized Shea nut extract can reduce the fat content of the prepared food product by a significant amount because most of the content of the Shea nut extract is not quantified as fat under the current Nutritional Labeling Education Act (NLEA) methods and standards for product labeling. Thus, because the α-amyrin and other sterols in the Shea nut extract are not analyzed as fats under the current NLEA methods of product labeling, the substitution of the normal fat in a prepared food product with the plasticized Shea nut extract of the present invention or with the Shea nut extract alone results in a direct reduction of fat content. Additionally, it is thought that the Shea nut extract is not well absorbed in the body. Accordingly, total dietary fat intake can be reduced by administering to a subject (human or animal) a prepared food product wherein a portion or all of the normal fat content of the prepared food product has been replaced with the plasticized Shea nut extract. Also, since the components of the Shea nut extract are minimally metabolized, the caloric value of the food product can be reduced.

When the fat portion of a food product is replaced by the Shea nut extract or plasticized Shea nut extract of the present invention, the functionality and manufacturability of the prepared food product is not significantly altered. Thus, the Shea nut extract or plasticized Shea nut extract of the present invention can be easily incorporated into existing manufacturing processes for prepared food products.

In general, prepared food products can have a fat concentration of approximately 0.1% to as high as approximately 90–95%. The portion of the fat content of a food product which can be replaced with the Shea nut extract or plasticized Shea nut extract of the present invention can range from approximately 0.1% to nearly 100%.

The plasticized Shea nut extract of the present invention can include the Shea nut extract portion in amounts ranging from approximately 2% to approximately 95% of the plasticized Shea nut extract, with the remainder composed of a diluent fat. The diluent fat or oil portion of the plasticized Shea nut extract can be present in amounts ranging from approximately 5% to 98% of the plasticized Shea nut extract. These ranges are given by way of example and could be even larger.

Additional agents such as emulsifiers, stabilizers or solubulizers or the like may be added to the plasticized Shea nut extract to add additional desirable properties such as stability and workability to the plasticized Shea nut extract as is known to those skilled in the art.

The fat substitute can be further processed into a function food ingredient as a paste/liquid by emulsification techniques using traditional food-grade emulsifiers including mono and diglycerides, acetylated monoglycerides, glycerol esters, lecithin, polyglycerol esters, propylene glycol esters, sugar esters, sorbitan esters, datems, medium chain triglycergies, and sodium and calcium stearoyl-2-lactylate. The processing includes single or multiple stage homogenization, turbine or shear mixing, shaking or pumping, and sonification. Furthermore, the fat substitute, unemulsified or emulsified as described above, can be encapsulated using wall or matrices materials such as natural food starches, maltodextrins, cornsyrup solids, sugars, gums, hydrocolloids, artificial or modified starches, food proteins and their chemical and enzymatic hydrolyzates, formulated enteric coatings, lipids and phosposlipids, waxes, insect and plant exudates, food isolates such as whey, and synthetic biodegradable biopolymers, by either simple or complex coacervation, spray drying, spray chilling, drum drying, freeze drying, liposome entrapment, amorphous glass inclusion, extrusion, marumorization or other swellable, erodable or other controlled release device.

As illustrated below, the plasticized Shea nut extract of the present invention can be readily incorporated into prepared food products, such as baked goods, ice cream, and popcorn demonstrating the utility of the present invention.

EXAMPLES

Example 1

Brownies Produced With the Plasticized Shea Nut Extract Fat Substitute

The plasticized Shea nut extract of the present invention was evaluated in a brownie formulation. The control formula used a combination of corn oil margarine and chocolate liqueur as the fat sources. The test formula utilized the plasticized Shea nut extract, composed of a 1:1 mixture of Shea nut extract with sunflower oil, and chocolate liqueur as the fat sources.

Material and Methods

The fat sources were melted together until liquid. The other ingredients, except for the flour, were mixed in a Hobart mixer at speed 1 for approximately 2 minutes. All purpose flour was then added to the mixer and mixed until well hydrated. The melted fat sources were then added and mixed until uniformly incorporated. Then 600 grams of each batter was poured into shallow pans and baked at 325° for 20–25 minutes.

Results

The eating qualities of the finished products were found to be very comparable. The ingredients for the control formula are shown in Table 1. The ingredients for the test formula including the plasticized Shea nut extract (labeled in Table 2 as Sunflower Oil/Sterol Blend) of the present invention are shown in Table 2.

TABLE 1

| Ingredient | Weight as % |
| --- | --- |
| Chocolate Liquor | 12.00 |
| Corn Oil Margarine | 18.00 |
| Sugar | 35.15 |
| 42 DE Corn Syrup | 5.00 |
| Salt | 0.35 |
| Sterling 2X Vanilla | 0.40 |
| Whole Eggs | 15.60 |
| All Purpose Flour | 13.50 |
| Totals | 100.00 |

TABLE 2

| Ingredient | Weight As % |
| --- | --- |
| Chocolate Liquor | 12.00 |
| Sunflower Oil/ Sterol Blend | 14.40 |
| Water | 3.60 |
| Sugar | 35.15 |
| 42 DE Corn Syrup | 5.00 |
| Salt | 0.35 |
| Sterling 2X Vanilla | 0.40 |
| Whole Eggs | 15.60 |
| All Purpose Flour | 13.50 |
| Totals | 100.00 |

Referring to Table 3, the total fat content of the test brownies was found to be approximately 34% less than the control batch illustrating the fat reduction by incorporation of the plasticized Shea nut extract and of the method for incorporating the plasticized Shea nut extract into a prepared food product to reduce its fat content.

TABLE 3

| Sample | Component | Nutritional Fat Content | |
| --- | --- | --- | --- |
| Control | Total Fat | 18.8% | (Tri-Glycerides) |
| | Saturated Fat | 5.9% | (Fatty Acids) |
| | Mono-Unsaturated Fat | 6.6% | (Fatty Acids) |
| | Poly-Unsaturated Fat | 4.2% | (Fatty Acids) |
| Test | Total Fat | 12.3% | (Tri-Glycerides) |
| | Saturated Fat | 4.6% | (Fatty Acids) |
| | Mono-Unsaturated Fat | 3.7% | (Fatty Acids) |
| | Poly-Unsaturated Fat | 3.4% | (Fatty Acids) |

Example 2

Oatmeal Cookies Produced With the Plasticized Shea Nut Extract Fat Substitute

The substitution of a portion of the normal fat with the plasticized Shea nut extract of the present invention in oatmeal cookies was examined in Example 2. Referring to Table 4, the ingredients for the control oatmeal cookie are listed. Referring to Table 5, the ingredients for an oatmeal cookie having a portion of its fat or oil replaced with the fat substitute of the present invention is illustrated.

TABLE 4

| Ingredient | Weight As % |
| --- | --- |
| Corn Oil Margarine | 27.76 |
| Sugar | 19.48 |
| Molasses, Lt Brown Sugar | 1.46 |
| Invert Sugar | 3.40 |
| Salt | 0.29 |
| Baking Soda | 0.39 |
| Whole Eggs | 4.87 |
| Sterling 2X Vanilla | 0.49 |
| All Purpose Flour | 18.10 |
| Cinnamon | 0.29 |
| Nutmeg | 0.07 |
| Quick Oats | 11.70 |
| Rolled Oats | 11.70 |
| Totals | 100.00 |

TABLE 5

| Ingredient | Weight As % |
| --- | --- |
| Corn Oil Margarine | 10.00 |
| Sterol/Sunflower Oil Blend | 17.76 |
| Sugar | 19.48 |
| Molasses, Lt. Brown Sugar | 1.46 |
| Invert Sugar | 3.40 |
| Salt | 0.29 |
| Baking Soda | 0.39 |
| Whole Eggs | 4.87 |
| Sterling 2X Vanilla | 0.49 |
| All Purpose Flour | 18.10 |
| Cinnamon | 0.29 |
| Nutmeg | 0.07 |
| Quick Oats | 11.70 |
| Rolled Oats | 11.70 |
| Totals | 100.00 |

The fat substitute was again a 1:1 blend of sunflower oil with the Shea nut extract. Table 6 demonstrates that a 30% decrease in total fat content was achieved by replacing approximately 63% of the fat or oil with the fat substitute of the present invention.

TABLE 6

| Sample | Component | Nutritional Fat Content | |
| --- | --- | --- | --- |
| Control | Total Fat | 25.0% | (Tri-Glycerides) |
| | Saturated Fat | 4.6% | (Fatty Acids) |
| | Mono-Unsaturated Fat | 8.5% | (Fatty Acids) |
| | Poly-Unsaturated Fat | 8.6% | (Fatty Acids) |
| Test | Total Fat | 17.8% | (Tri-Glycerides) |
| | Saturated Fat | 3.2% | (Fatty Acids) |
| | Mono-Unsaturated Fat | 5.2% | (Fatty Acids) |
| | Poly-Unsaturated Fat | 7.6% | (Fatty Acids) |

Example 3
Popcorn Produced With the Shea Nut Extract Fat Substitute

Three tablespoons of the sterol-oil mixture was melted in a pot. Three kernels of popcorn were added while heating the oil blend. When the kernels began popping, ⅓ cup of popcorn was added. The pot was covered and the mixture was heated until all of the kernels had popped. The finished popcorn tasted as good as popcorn made using full fat. Thus, the plasticized Shea nut extract could be used to reduce the fat content of popcorn, including microwave popcorn.

Example 4
Emulsification of the Plasticized Shea Nut Extract Fat Substitute

TABLE 7

| Ingredient | Weight as % |
| --- | --- |
| Plasticized Shea nut extract | 16.00 |
| Spray Gum 1RX61232, COLLOIDES | 3.00 |
| Mono- and Di-glycerides, Atlas 1500, ICI | 0.10 |
| Sodium stearoyl-2-lactylate, Atlas SSL, ICI | 0.12 |
| Tween 60, ICI | 0.03 |
| Maltodextrin | 80.75 |
| Total | 100.00 |

An emulsified blend of the plasticized Shea nut extract was prepared in the following manner. The plasticized Shea nut extract was mixed with the sodium stearoyl-2-lactylate and heated until melted (140°–150°). Next the water, Maltodextrin (10 DE) and gum Arabic were added slowly. The mixture was pasteurized by heating to 165° and holding for 15 min. The mixture was then cooled to 130° and homogenized with a homogenizer (Gaulin, 1st stage 2500 PSIG, 2nd stage 500 PSIG).

The emulsified plasticized Shea nut extract was encapsulated by feeding the emulsion to the dryer (5 gal/min) and dried using a Niro Minor model 1 with the inlet air set at 180°–190°, outlet air 90°–95°, centrifugal wheel atomization set at 20,000 rpm, and air flow set at 230 cfm to achieve a powder with particles that range from 100–500 micron, 1%–5% moisture, with a typical bulk density of 0.30 g/cm$^3$–0.55 g/cm$^3$. The emulsified and encapsulated fat substitute can be used in food products as described below.

Example 5

Frozen Dessert Produced With the Plasticized Shea Nut Extract Fat Substitute

TABLE 8

| Ingredient | Weight as % |
| --- | --- |
| Water | 61.388 |
| Sugar | 14.000 |
| Raftiline ST, Orafti | 5.815 |
| Rice pro, Zumbro Inc. | 3.175 |
| Oatrim, Rhodia | 4.000 |
| Corn syrup solids, Fro-Dex, Cerestar | 2.000 |
| Wip-Treme 3554, Kerry Ingredients | 3.300 |
| Gunther Versa-whip 520, Staley | 0.200 |
| Nutrish, a/B, Chr. Hansen's | 0.002 |
| Flavoring | 0.200 |
| Vitamin and Mineral Blend | 0.345 |
| Emulsified Fat Replacer | 4.875 |
| Salt | 0.400 |
| Stabilizer (PGX-1), Germantown | 0.300 |
| Total | 100.000 |

The ice cream mix was prepared by blending the ingredients together followed by homogenization. The liquid mix was then processed into soft serve ice cream using a Taylor Freezer Model 339 ice cream machine. The ice cream was found to have a pleasant and creamy taste and texture.

Example 6

Frozen Dessert Produced With the Plasticized Shea Nut Extract Fat Substitute

TABLE 9

| Ingredient | Weight as % |
| --- | --- |
| Skim Milk | 61.388 |
| Sugar | 14.000 |
| Raftiline ST, Orafti | 5.815 |
| Rice pro, Zumbro Inc. | 3.175 |
| Oatrim, Rhodia | 4.000 |
| Corn syrup solids, Fro-Dex, Cerestar | 2.000 |
| Wip-Treme 3554, Kerry Ingredients | 3.300 |
| Gunther Versa-whip 520, Staley | 0.200 |
| Nutrish, a/B, Chr. Hansen's | 0.002 |
| Flavoring | 0.200 |
| Vitamin and Mineral Blend | 0.345 |
| Emulsified Encapsulated Fat Substitute | 4.875 |
| Salt | 0.400 |
| Stabilizer (PGX-1), Germantown | 0.300 |
| Total | 100.000 |

This example was produced in the same manner as the previous example. It also had a pleasant, creamy taste and texture.

These examples demonstrate the utility of the fat substitute of the present invention and its ability to reduce fat content while maintaining the functionality of a full fat or oil.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

We claim:

1. A method for reducing the fat content and caloric value of a prepared food product comprising the steps of:
   a.) blending an amount of between 5 parts to 98 parts of a diluent fat with an amount of between 2 parts and 95 parts of a Shea nut extract to form 100 parts of a plasticized Shea nut extract; and
   b.) reducing the fat content of a prepared food product by removing a positive predetermined weight percent portion of a fat content in a prepared food product and replacing the removed weight percent portion of the fat content by adding a positive predetermined weight percent amount of the plasticized Shea nut extract to the food product the weight percent amount of the plasticized Shea nut extract being equal to or less than the weight percent portion of the fat removed.

2. A method as recited in claim 1 wherein the diluent fat comprises sunflower oil and step a.) comprises blending between 5 parts to 98 parts of the sunflower oil with between 2 parts and 95 parts of the Shea nut extract to form the plasticized Shea nut extract.

3. A method as recited in claim 2 wherein the amount of sunflower oil comprises 50 parts sunflower oil and the amount of Shea nut extract comprises 50 parts Shea nut extract and step a.) comprises blending 50 parts sunflower oil with 50 parts Shea nut extract to form the plasticized Shea nut extract.

4. A method as recited in claim 1 wherein the positive predetermined weight percent portion of the fat content comprises between 0.1% and 100% weight percent of the fat content and step b.) comprises removing between 0.1% and 100% weight percent of the fat content of a prepared food product from the formula for the food product and replacing the removed weight percent portion of the fat content by adding the predetermined weight percent amount of the plasticized Shea nut extract to the formula for the prepared food product.

5. A method as recited in claim 1 wherein the prepared food product comprises a baked food product and step b.) comprises removing the predetermined weight percent portion of the fat content from the formula for the baked food product and replacing the removed weight percent portion of the fat content by adding the predetermined weight percent amount of the plasticized Shea nut extract to the formula for the baked food product, then baking the baked food product.

6. A method as recited in claim 5 wherein the baked food product comprises a brownie and step b.) comprises removing between 0.1% and 100% weight percent of the fat content from the formula for the brownie and replacing the removed weight percent portion of the fat content by adding the predetermined weight percent amount of the plasticized Shea nut extract to the formula for the brownie and then baking the brownie.

7. A method as recited in claim 5 wherein the baked food product comprises a cookie and step b.) comprises removing between 0.1% and 100% weight percent of the fat content from the formula for the cookie and replacing the removed weight percent portion of the fat content by adding the predetermined weight percent amount of the plasticized Shea nut extract to the formula for the cookie and then baking the cookie.

8. A method as recited in claim 1 wherein step a.) comprises the further steps of emulsifying the plasticized Shea nut extract and encapsulating the emulsified Shea nut extract to form a powder, and step b.) comprises the further steps of removing a predetermined weight percent portion of a fat content in a prepared food product and replacing the removed weight percent portion of the fat content by adding a predetermined weight percent amount of the emulsified and encapsulated plasticized Shea nut extract to the food product, the weight percent amount of the emulsified and encapsulated plasticized Shea nut extract being equal to or less than the weight percent portion of the fat removed.

9. A method as recited in claim 8 wherein the prepared food product comprises an ice cream and step b.) comprises removing a predetermined weight percent portion of a fat content from the ice cream and replacing the removed weight percent portion of the fat content by adding a predetermined amount of the emulsified and encapsulated plasticized Shea nut extract to the ice cream.

10. A prepared food product comprising:
    a prepared food product including a positive predetermined weight percent amount of a plasticized Shea nut extract;
    said plasticized Shea nut extract including between 5 parts to 98 parts of a diluent fat and between 2 parts and 95 parts of a Shea nut extract for a total of 100 parts of plasticized Shea nut extract.

11. A prepared food product as recited in claim 10 wherein said predetermined weight percent amount of said plasticized Shea nut extract comprises between 0.1% to 95% of said food product.

12. A prepared food product as recited in claim 10 wherein said diluent fat comprises sunflower oil.

13. A prepared food product as recited in claim 12 wherein said plasticized Shea nut extract comprises 50 parts sunflower oil and 50 parts Shea nut extract.

14. A prepared food product as recited in claim 10 wherein said food product comprises a baked food product.

15. A prepared food product as recited in claim 14 wherein said baked food product comprises a brownie.

16. A prepared food product as recited in claim 14 wherein said baked food product comprises a cookie.

17. A prepared food including a positive predetermined weight percent amount of a plasticized Shea nut extract;

said plasticized Shea nut extract being an emulsified and encapsulated powder having between 5 parts to 98 parts of a diluent fat and between 2 parts and 95 parts of a Shea nut extract for a total of 100 parts of plasticized Shea nut extract.

18. A prepared food product as recited in claim 17 wherein said prepared food product comprises an ice cream.

19. A prepared food product as recited in claim 17 wherein said plasticized Shea nut extract emulsified and encapsulated powder comprises particles having a size ranging from between 100 to 500 microns in diameter.

* * * * *